Patented Mar. 20, 1945

2,372,153

UNITED STATES PATENT OFFICE 2,372,153

RESIN COMPOSITIONS

Orland H. Yoxsimer, Mansfield, Ohio, assignor to Westinghouse Electric & Manufacturing Company, East Pittsburgh, Pa., a corporation of Pennsylvania No Drawing. Application January 7, 1942, Serial No. 425,879

1 Claim. (Cl. 106—189)

This invention relates to moldable compositions and more particularly to cellulose acetate butyrate thermoplastic modified in such a manner as to provide for improved service characteristics.

The object of this invention is to provide for a cellulose acetate butyrate having vanillin or coumarin or other desired essential oils present to reduce the formation of objectionable odors when exposed to conditions of moisture or elevated temperature.

Another object of the invention is to provide for incorporating vanillin or coumarin in a cellulose acetate butyrate comminuted molding powder in the production of moldings usable in refrigerators without the formation of objectionable odors.

Other objects of the invention will, in part, be obvious, and will, in part, appear hereinafter.

Cellulose acetate thermoplastic may be modified by introducing butyrate to provide for improved properties in the composition resin. The modified composition is characterized by ease of ejection molding, whereby moldings are produced under similar molding conditions that are much harder and tougher than cellulose acetate alone. The cellulose acetate butyrate compositions are tough and resist deterioration when subjected to conditions of low temperature. Furthermore, the composite substance is more resistant to moisture than cellulose acetate alone.

On account of these properties, as well as others, the cellulose acetate butyrate compositions have been deemed desirable for many applications. However, it has been a matter of common knowledge that under conditions of humidity which exist, for example, within a refrigerator, that the cellulose acetate butyrate partially decomposes and produces a highly objectionable odor characteristic of butyric acid and butyrates. Physically and chemically, the cellulose acetate butyrates are otherwise superior to compositions being employed at the present time for food tray handles, ice cube compartment doors, and other parts in the interior of refrigerators. The objectionable odor produced by the cellulose acetate butyrate has been the sole drawback against the employment of the resin inside refrigerators and similar types of appliances.

According to this invention, cellulose acetate butyrate moldings are prepared by incorporating therein a quantity of vanillin, or coumarin or other essential oils. Moldings prepared with this admixture have been employed successfully in refrigerators without objectionable odors being evident in the refrigerator. Because of inherent difficulties, it has not been completely ascertained wether the vanillin or coumarin combine with the butyrates or butyric acid which may be produced under conditions of moisture, or whether the vanillin or coumarin combine in the cellulose acetate butyrate molecules to prevent the formation of the objectionable odoriferous compounds. It is believed that the effect is more than a masking of the unpleasant odor although the masking effect does occur to some extent. Moldings prepared from the mixture of vanillin and coumarin and the cellulose acetate butyrate resin have a faint odor characteristic of vanilla. Regardless of the reaction in the mixture, highly satisfactory moldings for refrigerator and allied use have been produced and are supplanting resins which have been employed for the same type of parts in these appliances.

In preparing moldings of the type disclosed, a satisfactory proportion of vanillin, or coumarin, or both, to cellulose acetate butyrate consists of from 0.25% to 5% of the weight of the cellulose acetate butyrate. The vanillin or coumarin, or both, are incorporated in a finely comminuted state in cellulose acetate butyrate molding powder. The pigments or dyes which are employed to impart a predetermined coloration to the cellulose acetate butyrate may be incorporated in the molding powder at the same time. The material is thoroughly stirred in order to obtain a uniform and homogeneous mixture. The powdered mixture is suitable for introduction into injection molding machines or into other types of molding apparatus for molding under heat and pressure into predetermined shapes. The resulting product will have a smooth surface and is a tough, strong and chemically resistant material capable of withstanding conditions present in refrigerators and similar appliances.

It is to be understood that the particular form of the product shown and described and the particular procedure set forth are presented for the purposes of explanation and illustration, and that various modifications of such product and procedure can be made without departing from my invention as defined in the appended claims.

I claim as my invention:

A molded member for use in refrigerators comprising, in combination, cellulose acetobutyrate and a substance selected from the group consisting of vanillin and coumarin distributed in the cellulose acetobutyrate in amounts ranging from 0.25% to 5% of the weight of the cellulose acetobutyrate, the member being light, tough, resistant to deterioration in humid atmospheres and substantially free from objectionable odor.

ORLAND H. YOXSIMER.